(12) United States Patent
Wu

(10) Patent No.: US 7,044,477 B2
(45) Date of Patent: May 16, 2006

(54) CHUCK ASSEMBLY WITH A COOLING MECHANISM

(76) Inventor: Hsuan-Lung Wu, No. 4-6, Le-Tien Lane, Feng-Shu Li, Nan-Tun Dist., Taichung City (TW)

(*) Notice: Subject to any disclaimer, the term of this patent is extended or adjusted under 35 U.S.C. 154(b) by 465 days.

(21) Appl. No.: 10/643,466

(22) Filed: Aug. 19, 2003

(65) Prior Publication Data

US 2005/0040608 A1    Feb. 24, 2005

(51) Int. Cl.
   *B23B 31/30* (2006.01)
(52) U.S. Cl. .................. 279/4.08; 279/51; 279/137
(58) Field of Classification Search .............. 279/51, 279/137, 4.07, 4.09, 4.08
   See application file for complete search history.

(56) References Cited

U.S. PATENT DOCUMENTS 4,032,162 A * 6/1977 Flinchbaugh ............... 279/4.09
4,312,513 A * 1/1982 Swenson .................... 279/4.08
4,791,841 A * 12/1988 Pruvot et al. ................. 82/147
6,173,971 B1 * 1/2001 Shen ........................ 279/4.08
6,497,417 B1 * 12/2002 Wu ........................... 279/4.08

FOREIGN PATENT DOCUMENTS

EP          172571 A1 *  2/1986
JP        58056712 A  *  4/1983

* cited by examiner

Primary Examiner—Boyer D. Ashley
Assistant Examiner—J Williams
(74) Attorney, Agent, or Firm—Frommer Lawrence & Haug LLP; Ronald R. Santucci

(57) ABSTRACT

A chuck assembly includes a housing formed with a hydraulic fluid inlet, a sleeve mounted in the housing and formed with an annular groove, a shaft mounted rotatably in the sleeve and formed with a fluid passage, a chuck unit mounted in the shaft, a piston subdividing a chamber between the chuck unit and the shaft into first and second compartments, and a cooling mechanism having an air inlet formed in the housing, and an air channel formed in the sleeve and in fluid communication with the air inlet and the annular groove.

5 Claims, 6 Drawing Sheets

CHUCK ASSEMBLY WITH A COOLING MECHANISM

BACKGROUND OF THE INVENTION

1. Field of the Invention

This invention relates to a chuck assembly, more particularly to a chuck assembly with a cooling mechanism for cooling a hydraulic fluid in a clearance between a shaft and a sleeve of the chuck assembly.

2. Description of the Related Art

U.S. Pat. No. 6,497,417 discloses a conventional chuck assembly 1 that includes a housing 10 defining an inner space, a shaft 11 mounted co-axially and rotatably in the inner space and defining a chuck-receiving space 13 which has an enlarged end portion defining a piston-receiving chamber 131, a sleeve 12 secured to the housing 10 and sleeved on the shaft 11 so as to define a clearance 14 therebetween, a bearing unit 18 disposed between the sleeve 12 and the shaft 11, a chuck unit mounted in the chuck-receiving space 13 and including a plurality of jaws 16 for holding a workpiece (not shown), and a piston 15 mounted in the piston-receiving chamber 131, displaceable in an axial direction, and connected to the jaws 16 in such a manner that axial displacement of the piston 15 results in radial displacement of the jaws 16. The piston 15 subdivides the piston-receiving chamber 131 into first and second compartments 1311, 1312. A fluid channel 17 is formed in the chuck assembly 1, is in fluid communication with the first compartment 1311 of the piston-receiving chamber 131, and is adapted to be connected to a hydraulic fluid supply (not shown) so as to permit flow of pressurized hydraulic fluid into the first compartment 1311, thereby resulting in axial displacement of the piston 15.

Since the shaft 11 is operated at a relatively high speed, a relatively large amount of heat is generated due to friction between the shaft 11 and the sleeve 12, which significantly increases the temperature of the hydraulic fluid in the clearance 14, which, in turn, results in an adverse effect on the performance of the chuck assembly 1.

The disclosure of U.S. Pat. No. 6,497,417 is incorporated herein by reference.

SUMMARY OF THE INVENTION

The object of the present invention is to provide a chuck assembly with a cooling mechanism that is capable of overcoming the aforesaid drawback of the prior art.

According to the present invention, a chuck assembly comprises: a housing that defines a cylindrical inner space therein and that is formed with a hydraulic fluid inlet adapted to be connected to a hydraulic fluid supply; a sleeve that is co-axially mounted in the inner space, that is secured to the housing, that defines a rotary-receiving space therein, and that is formed with an annular groove in fluid communication with the hydraulic fluid inlet; a rotary unit co-axially and rotatably extending through the rotary-receiving space, cooperating with the sleeve to define a clearance therebetween, and including a hollow shaft that defines a chuck-receiving space therein, that is rotatable relative to the sleeve about an axis, and that is formed with a fluid passage in fluid communication with the annular groove, the clearance being in fluid communication with the annular groove; a chuck unit that is co-axially mounted in the chuck-receiving space, that includes a plurality of angularly displaced jaws, and that cooperates with the shaft to define a piston-receiving chamber therebetween; a piston that is co-axially mounted in the piston-receiving chamber, that subdivides the piston-receiving chamber into first and second compartments, that is displaceable in an axial direction relative to the axis, and that is connected to the chuck unit in such a manner that axial displacement of the piston results in radial displacement of the jaws, the first compartment being in fluid communication with the fluid passage so as to permit entry of the hydraulic fluid therein, which, in turn, results in axial displacement of the piston; and a cooling mechanism having an air inlet that is formed in the housing and that is adapted to be connected to an air supply, and an air channel that is formed in the sleeve and that is in fluid communication with the air inlet and the annular groove so as to permit entry of an air flow into and through the clearance upon actuation of the air supply.

BRIEF DESCRIPTION OF THE DRAWINGS

In drawings which illustrate embodiments of the invention.

DETAILED DESCRIPTION OF THE PREFERRED EMBODIMENTS

Figure 1:
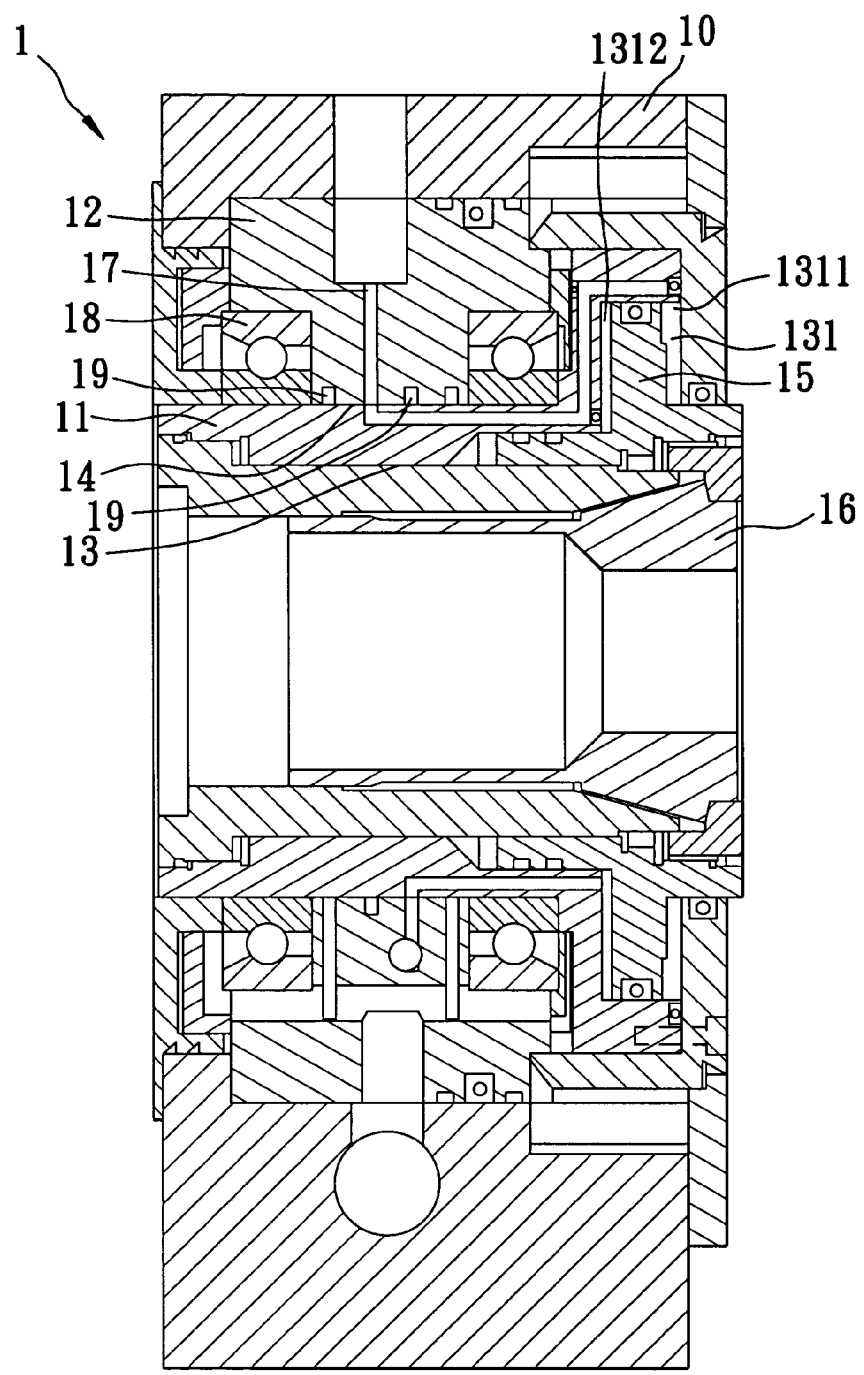
FIG. 1 is a sectional view of a conventional chuck assembly.
Figure 2:
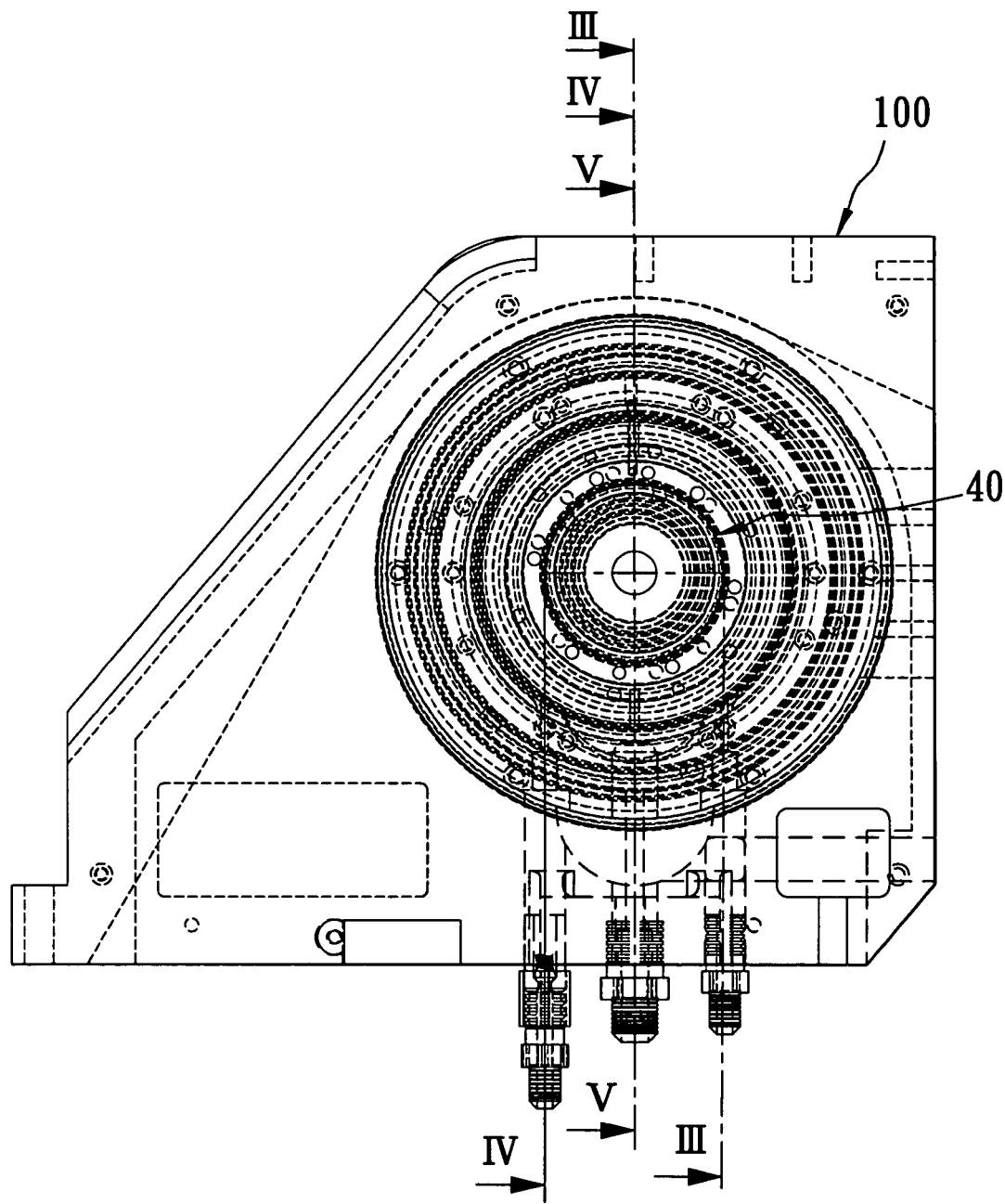
FIG. 2 is a side view of the first preferred embodiment of a chuck assembly according to this invention.

For the sake of brevity, like elements are denoted by the same reference numerals throughout the disclosure.

FIGS. 2 to 5 illustrate the first preferred embodiment of a chuck assembly according to this invention for holding a workpiece (not shown).

The chuck assembly includes: a housing 100 that defines a cylindrical inner space 101 therein and that is formed with a hydraulic fluid inlet 102 (see FIG. 3) adapted to be connected to a hydraulic fluid supply (not shown); a sleeve 20 that is co-axially mounted in the inner space 101, that is secured to the housing 100, that defines a rotary-receiving space 22 therein, and that is formed with an annular groove 23 in fluid communication with the hydraulic fluid inlet 102; a rotary unit 30 co-axially and rotatably extending through the rotary-receiving space 22, cooperating with the sleeve 20 to define a clearance 221 therebetween, and including a hollow shaft 31 that defines a chuck-receiving space 301 therein, that is rotatable relative to the sleeve 20 about an axis, and that is formed with a first fluid passage 312 in fluid communication with the annular groove 23, the clearance 221 being in fluid communication with the annular groove 23; a chuck unit 40 that is co-axially mounted in the chuck-receiving space 301, that includes left and right chuck bodies, and that cooperates with the shaft 31 to define a piston-receiving chamber 311 therebetween, each of the left and right chuck bodies having a plurality of angularly displaced jaws 44; a piston 33 that is co-axially mounted in the piston-receiving chamber 311, that subdivides the piston-receiving chamber 311 into first and second compartments 3111, 3112, that is displaceable in an axial direction relative to the axis, and that is connected to the chuck unit 40 in such a manner that axial displacement of the piston 33 results in radial displacement of the jaws 44 of each of the left and right chuck bodies, the first compartment 3111 being in fluid communication with the first fluid passage 312 so as to permit entry of the hydraulic fluid therein, which, in turn, results in axial displacement of the piston 33; and a cooling mechanism having an air inlet 61 (see FIG. 4) that is formed in the housing 100 and that is adapted to be connected to an air supply (not shown), and an air channel 24 that is formed in the sleeve 20 and that is in fluid communication with the air inlet 61 and the annular groove 23 so as to permit entry of an air flow into and through the clearance 22 upon actuation of the air supply after the supply of the hydraulic fluid is stopped, thereby cooling the hydraulic fluid trapped in the clearance 22 during rotation of the shaft 31. A check valve 62 is installed in the air inlet 61 for permitting the air flow to flow therethrough in a forward direction from the air supply to the air inlet 61 and for preventing the air flow from returning in a reverse direction opposite to the forward direction.

An urging member 34 is mounted in the second compartment 3112 in the piston-receiving chamber 311, and abuts against the piston 33 so as to accumulate a restoring force for restoring the piston 33 back to a normal position when the pressurized hydraulic fluid enters into the first compartment 3111 and moves the piston 33 to compress the urging member 34.

The chuck unit 40 further includes left and right actuating members 42, 43 that are respectively associated with the left and right chuck bodies, and a connecting member 45 that interconnects the left and right chuck bodies. The piston 33 is connected to the left actuating member 42 in such a manner that axial displacement of the piston 33 in a direction toward the urging member 34 (i.e., compresses the urging member 34) during the release of the workpiece from the left and right chuck bodies results in movement of the left actuating member 42 together with the connecting member 45 away from the left chuck body, which, in turn, results in pushing of the left chuck body through the connecting member 45 and thus movement of the right chuck body away from the right actuating member 43.

The rotary unit 30 further includes a bearing spacer ring 35 that is sleeved on the shaft 31 and that cooperates with the sleeve 20 to define the clearance 22 therebetween. The bearing spacer ring 35 is formed with a second fluid passage 351 that is in fluid communication with the first fluid passage 312 and the annular groove 23, and cooperates with the shaft 31 and the sleeve 20 to define a pair of bearing-receiving spaces for receiving a pair of bearings 36 therein, respectively.

Figure 3:
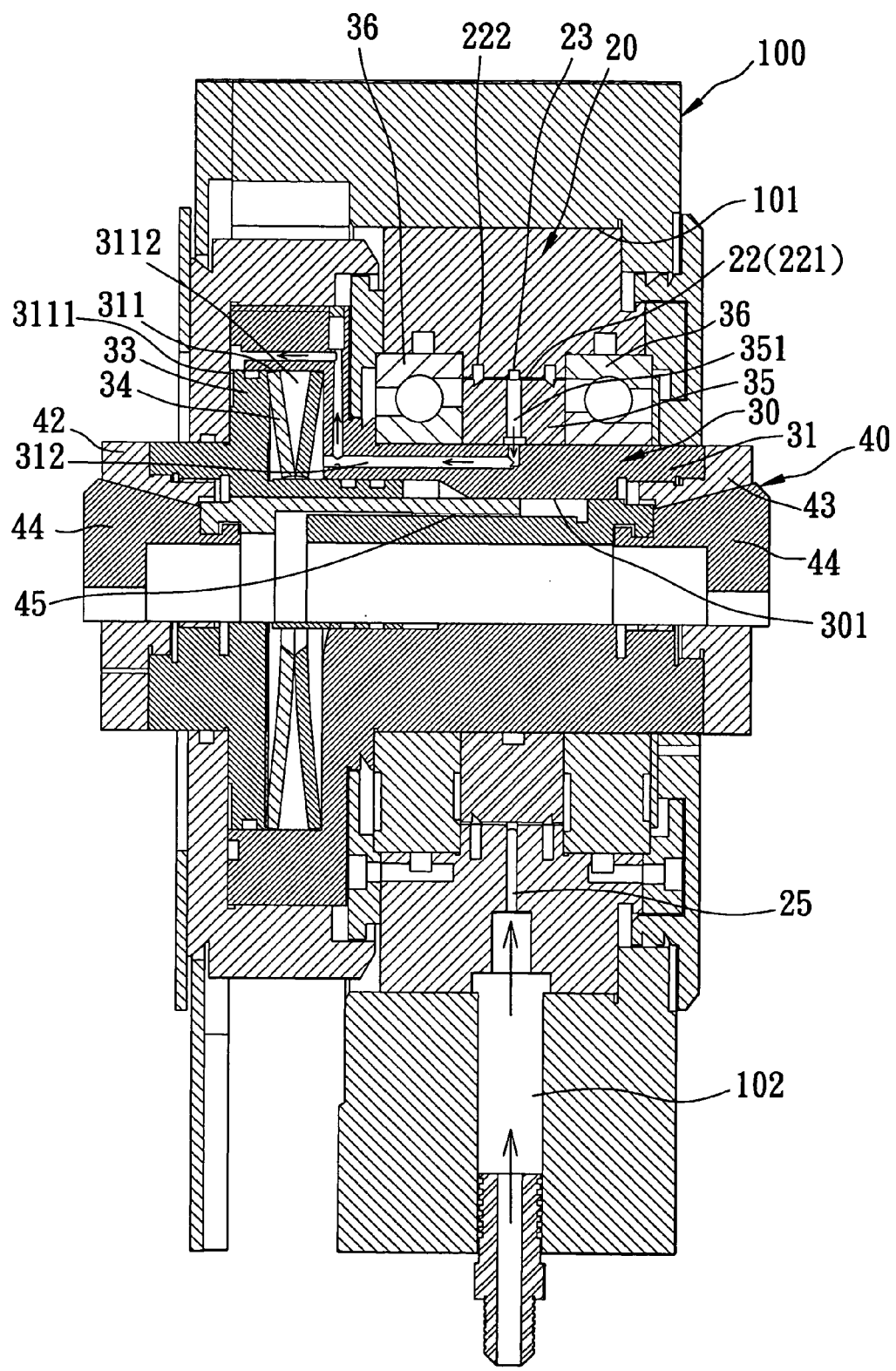
FIG. 3 is a sectional view of the chuck assembly taken along lines III—III in FIG. 2.

Referring to FIG. 3, the sleeve 20 is further formed with an oil channel 25 that is in fluid communication with the annular groove 23 in the sleeve 20 and the hydraulic fluid inlet 102 in the housing 100.

Figure 5:
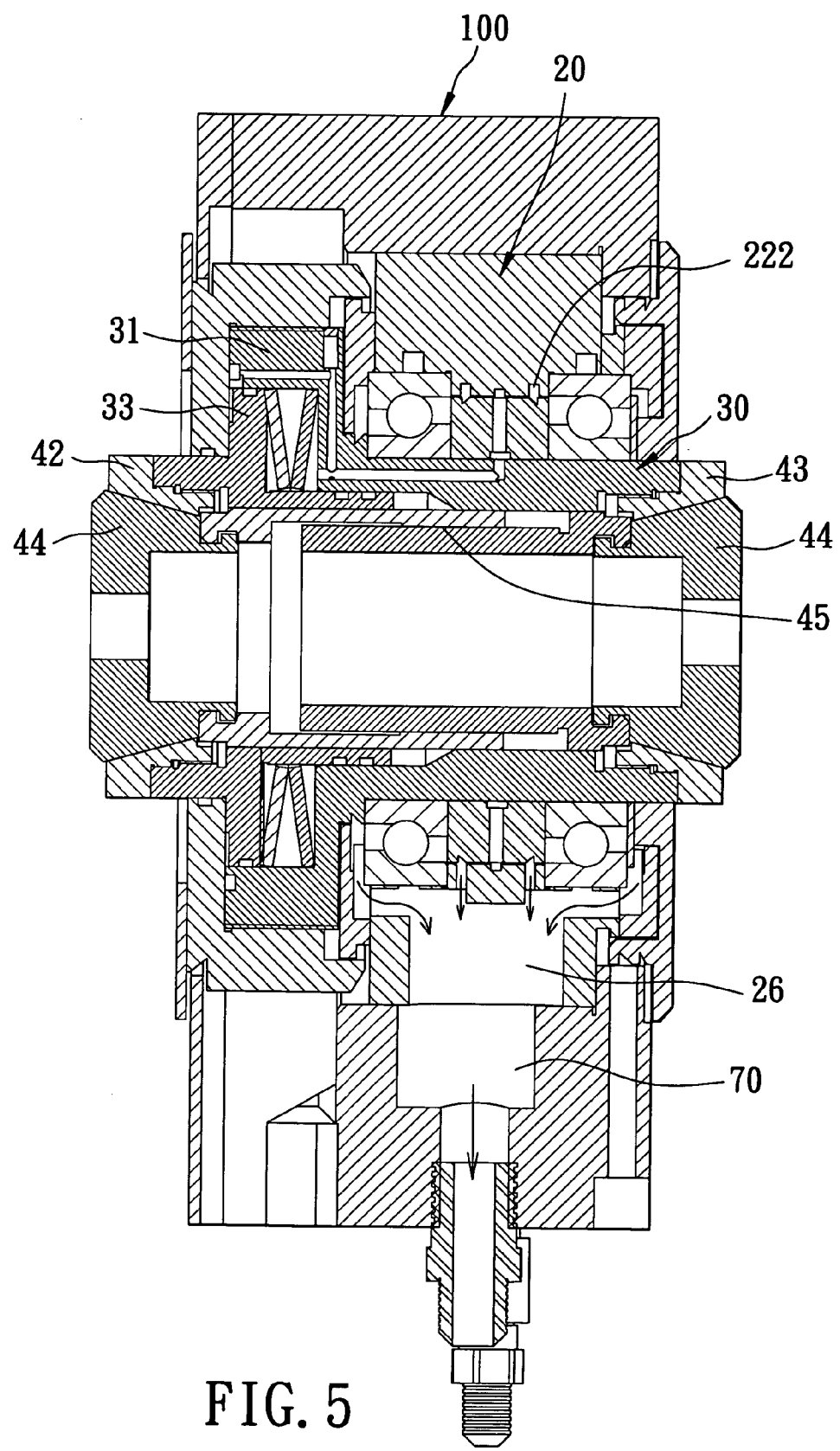
FIG. 5 is a sectional view of the chuck assembly taken along lines V—V in FIG. 2.

Referring to FIG. 5, the housing 100 is further formed with an oil outlet 70 that is adapted to be connected to an oil collector (not shown). The sleeve 20 is formed with a second oil channel 26 that is in fluid communication with the oil outlet 70 in the housing 100 and the annular groove 23 in the sleeve 20 so as to collect the hydraulic fluid leaking from the clearance 22.

Figure 4:
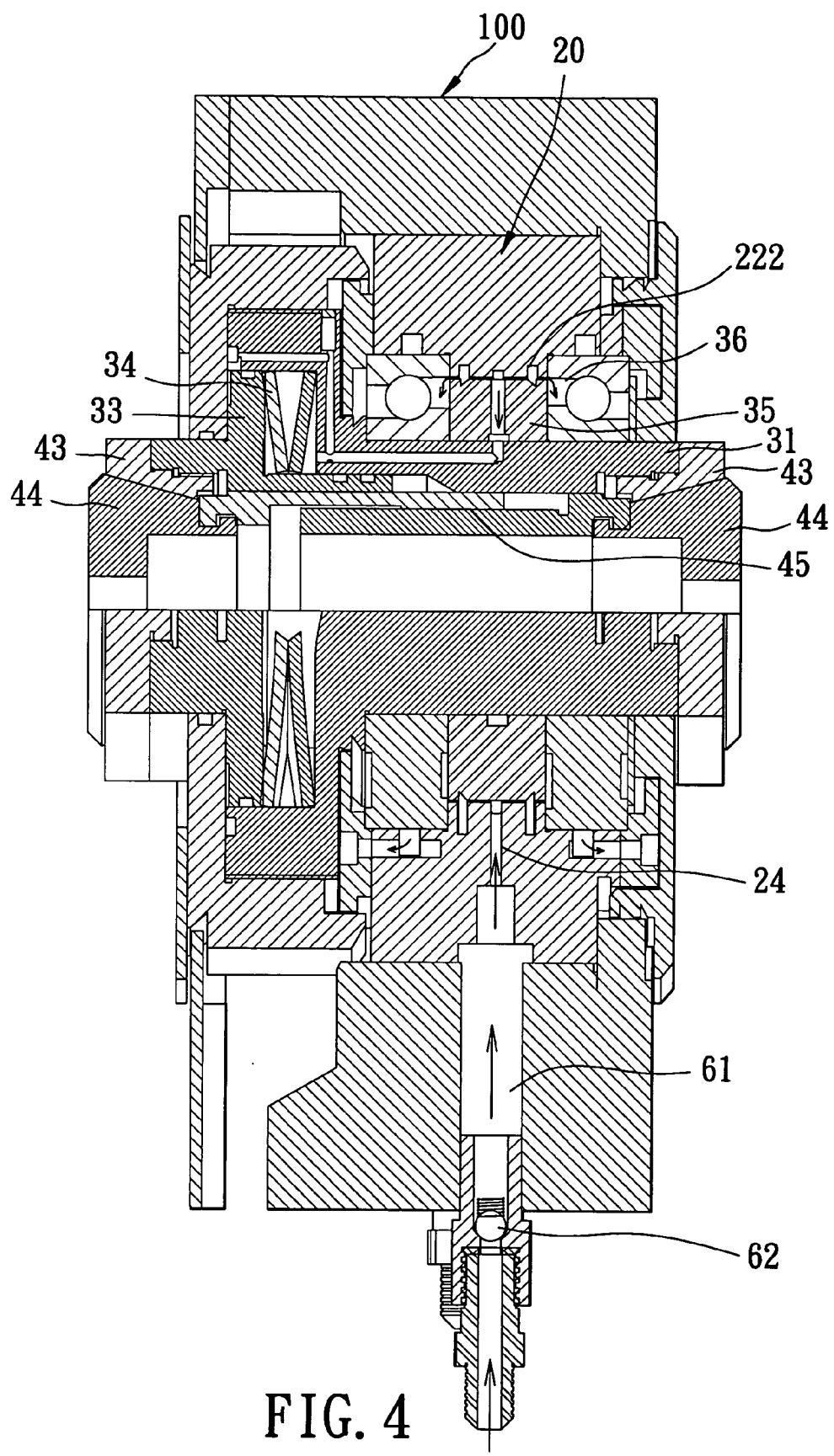
FIG. 4 is a sectional view of the chuck assembly taken along lines IV—IV in FIG. 2.

Referring to FIGS. 3 to 5, a plurality of hydraulic fluid storing grooves 222 are formed in the sleeve 20, and are in fluid communication with the clearance 22 for collecting the hydraulic fluid therein.

Figure 6:
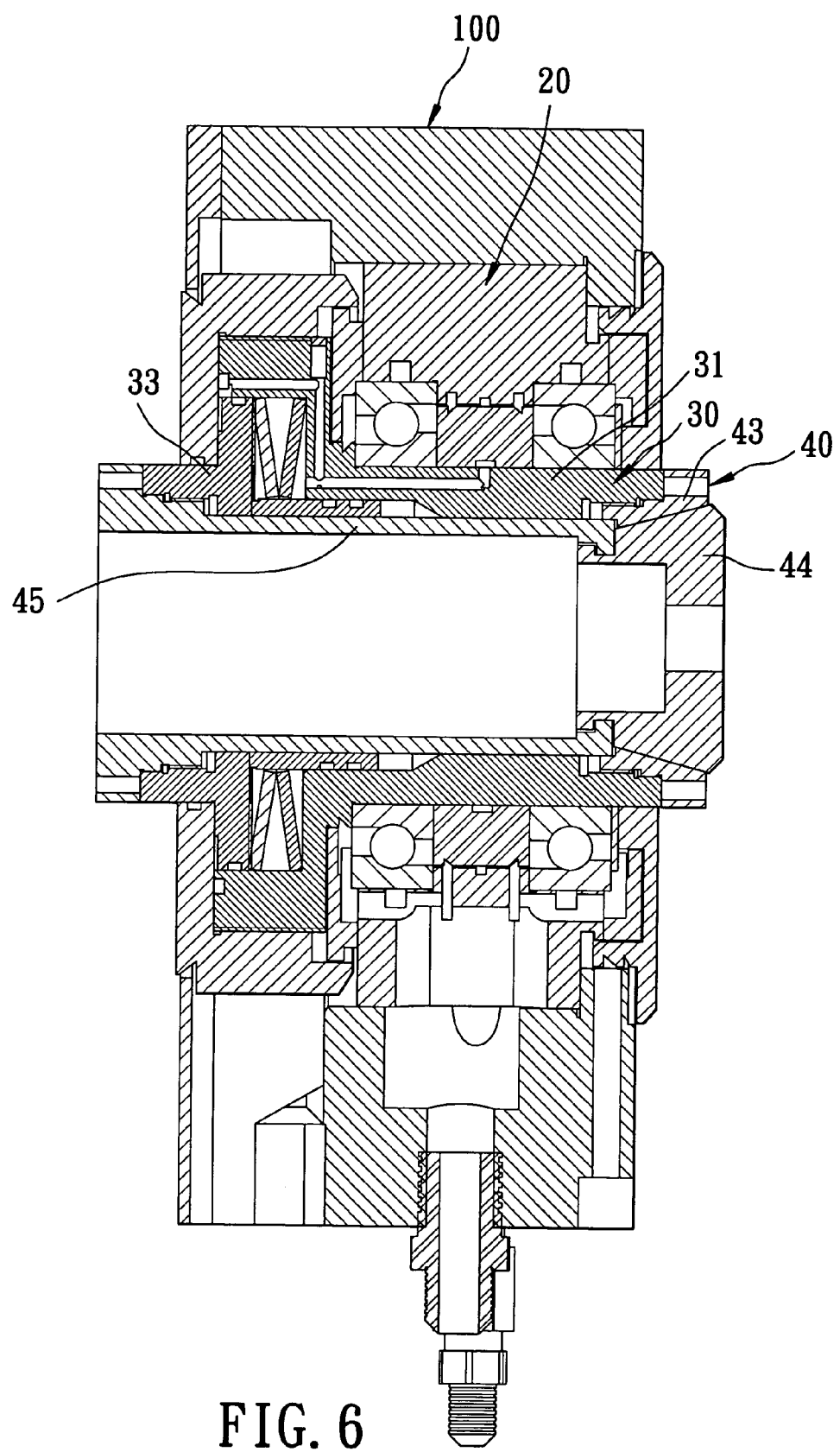
FIG. 6 is a sectional view of the second preferred embodiment of the chuck assembly according to this invention.

FIG. 6 illustrates the second preferred embodiment of the chuck assembly according to this invention. The chuck assembly of this embodiment differs from the previous embodiment in that the chuck unit 40 includes a sole chuck body.

With the inclusion of the cooling mechanism in the chuck assembly of this invention, the aforesaid drawback as encountered in the prior art can be eliminated.

With the invention thus explained, it is apparent that various modifications and variations can be made without departing from the spirit of the present invention. It is therefore intended that the invention be limited only as recited in the appended claims.

I claim:

1. A chuck assembly comprising:
   a housing that defines a cylindrical inner space therein and that is formed with a hydraulic fluid inlet adapted to be connected to a hydraulic fluid supply;
   a sleeve that is co-axially mounted in said inner space, that is secured to said housing, that defines a rotary-receiving space therein, and that is formed with an annular groove in fluid communication with said hydraulic fluid inlet;
   a rotary unit co-axially and rotatably extending through said rotary-receiving space, cooperating with said sleeve to define a clearance therebetween, and including a hollow shaft that defines a chuck-receiving space therein, that is rotatable relative to said sleeve about an axis, and that is formed with a first fluid passage in fluid communication with said annular groove, said clearance being in fluid communication with said annular groove;
   a chuck unit that is co-axially mounted in said chuck-receiving space, that includes a plurality of angularly displaced jaws, and that cooperates with said shaft to define a piston-receiving chamber therebetween;
   a piston that is co-axially mounted in said piston-receiving chamber, that subdivides said piston-receiving chamber into first and second compartments, that is displaceable in an axial direction relative to said axis, and that is connected to said chuck unit in such a manner that axial displacement of said piston results in radial displacement of said jaws, said first compartment being in fluid communication with said first fluid passage so as to permit entry of the hydraulic fluid therein, which, in turn, results in axial displacement of said piston; and
   a cooling mechanism having an air inlet that is formed in said housing and that is adapted to be connected to an air supply, and an air channel that is formed in said sleeve and that is in fluid communication with said air inlet and said annular groove so as to permit entry of an air flow into and through said clearance upon actuation of the air supply.

2. The chuck assembly of claim 1, wherein said rotary unit further includes a bearing spacer ring that is sleeved on said shaft and that cooperates with said sleeve to define said clearance therebetween, said bearing spacer ring being formed with a second fluid passage that is in fluid communication with said first fluid passage and said annular groove.

3. The chuck assembly of claim 2, wherein said sleeve is further formed with an oil channel that is in fluid communication with said annular groove in said sleeve and said hydraulic fluid inlet in said housing.

4. The chuck assembly of claim 3, wherein said housing is further formed with an oil outlet that is adapted to be connected to an oil collector, said sleeve being formed with a second oil channel that is in fluid communication with said oil outlet in said housing and said annular groove in said sleeve.

5. The chuck assembly of claim 2, further comprising an urging member that is mounted in said second compartment and that abuts against said piston so as to accumulate a restoring force when the hydraulic fluid enters into said first compartment and moves said piston to compress said urging member.

* * * * *